(12) United States Patent
Nakaguma et al.

(10) Patent No.: US 7,649,041 B2
(45) Date of Patent: Jan. 19, 2010

(54) AQUEOUS COATING COMPOSITION

(75) Inventors: Hirohide Nakaguma, Sakura (JP); Ren-Hua Jin, Tokyo (JP); Seungtaeg Lee, Sakura (JP)

(73) Assignees: DIC Corporation, Tokyo (JP); Kawamura Institute of Chemical Research, Sakura-shi (JP)

( * ) Notice: Subject to any disclaimer, the term of this patent is extended or adjusted under 35 U.S.C. 154(b) by 300 days.

(21) Appl. No.: 11/629,529

(22) PCT Filed: Jun. 23, 2005

(86) PCT No.: PCT/JP2005/011510

§ 371 (c)(1),
(2), (4) Date: Dec. 14, 2006

(87) PCT Pub. No.: WO2006/003829

PCT Pub. Date: Jan. 12, 2006

(65) Prior Publication Data

US 2009/0043037 A1  Feb. 12, 2009

(30) Foreign Application Priority Data

Jun. 30, 2004  (JP) ............................. 2004-193421

(51) Int. Cl.
  *C08K 5/54* (2006.01)
  *C08L 63/00* (2006.01)
(52) U.S. Cl. ...................... 524/263; 523/403
(58) Field of Classification Search .............. 524/263; 523/403
See application file for complete search history.

(56) References Cited

U.S. PATENT DOCUMENTS 6,103,788 A *  8/2000  Harui et al. ................. 523/403
2002/0045683 A1  4/2002  Kiyohara et al.

FOREIGN PATENT DOCUMENTS

| EP | 1775329 A1 | 4/2007 |
| JP | 3-212451 | 9/1991 |
| JP | 9-194762 | 7/1997 |
| JP | 11-271521 | 10/1999 |
| JP | 2000-103993 | 4/2000 |
| JP | 2002-12817 | 1/2002 |

OTHER PUBLICATIONS

Translation of JP 2000-103993, Apr. 2000.*
Supplementary European Search Report dated Jul. 7, 2009, issued on the corresponding European patent application No. 05752884.6.

* cited by examiner

*Primary Examiner*—Ling-Siu Choi
*Assistant Examiner*—Hui Chin
(74) *Attorney, Agent, or Firm*—Edwards Angell Palmer & Dodge LLP

(57) ABSTRACT

An aqueous coating composition comprising a hydrophilic cationic polymer having an amino group (A), nonionic polyalcohol (B), a tri- or more valent silane compound (C), and water (D). According to the aqueous coating composition of the present invention, it is possible to produce an organic and inorganic hybrid coating film having a high degree of hardness and excellent abrasion resistance in relative mild production conditions by a simple method.

12 Claims, No Drawings

AQUEOUS COATING COMPOSITION

TECHNICAL FIELD

The present invention relates to an aqueous coating composition which provides a hybrid coating comprising organic and inorganic components.

BACKGROUND ART

Silica films obtained by a sol-gel reaction have been widely known as a film having a high degree of hardness. However, when a film is obtained by using only silica, cracks are generated in the film. Therefore, anti-cracking properties of the silica film are improved by using an organic polymer having film forming properties and toughness together with silica.

As a composition which provides a silica film containing an organic polymer, a uniform solution in which an amide group containing non-reactive polymer and hydrolysable metal oxide such as a specific silane are dissolved uniformly in an alcohol solvent has been suggested (For example, Patent Document 1). When the uniform solution is used and the hydrolysable metal oxide is subjected to a hydrolysis polycondensation reaction to make it a gel, an organic•inorganic complex transparent homogeneous substance in a film state can be obtained by keeping it in a film shape until the gelatinization of the uniform solution and removing the solvent. However, the uniform solution contains an alcohol solvent; therefore, it has been desired to change the alcohol solvent to an aqueous solvent in order to decrease environmental load.

In addition, as a silica film forming solution containing an aqueous solvent, a coating solution which comprises a silane compound, organic strong base, and a polar group containing polymer, and in which the silane compound is dissolved in the presence of the organic strong base, has been suggested (for example, in Patent Document 2). However, the coating film obtained by the coated solution has an insufficient degree of hardness and insufficient abrasion resistance in the filed of an inorganic coating film including a coating material. Therefore, it has been desired to improve these properties.

Patent Document 1: Japanese Unexamined Patent Application, First Publication No. H3-212451

Patent Document 2: Japanese Unexamined Patent Application, First Publication No. H11-271521

DISCLOSURE OF THE INVENTION

Problems to be Solved by the Present Invention

The problems to be solved by the present invention is to provide an aqueous coating composition which contains an aqueous solvent and which provides an organic and inorganic hybrid film having a high degree of hardness and excellent abrasion resistance.

Means for Solving the Problem

According to the aqueous coating composition comprising a hydrophilic cationic polymer having an amino group (A), nonionic polyalcohol (B), a tri- or more valent silane compound (C), and water (D) of the present invention, (1) it is possible to increase the cross-linking density in the condensation reaction of the silane compound (C) because the hydrophilic cationic polymer having an amino group (A) functions as a catalyst of the condensation reaction of the tri- or more valent silane compound (C) in the aqueous coating composition. In addition, (2) it is also possible to form a strong hydrogen bond between a hydroxyl group of the nonionic polyalcohol (B) and a silanol group in the course of the condensation reaction of the silane compound (C). Thereby, it is possible to provide an organic and inorganic hybrid film of silica and polymer, which has a high degree of hardness and excellent abrasion resistance.

In other words, the present invention provides an aqueous coating composition which is obtained by mixing a hydrophilic cationic polymer having an amino group (A), nonionic polyalcohol (B), a tri- or more valent silane compound (C), and water (D).

In addition, the present invention provides the aqueous coating composition, wherein the hydrophilic cationic polymer having an amino group (A) is natural polyamine or synthesized polyamine.

In addition, the present invention provides the aqueous coating composition, wherein the nonionic polyalcohol (B) is at least one selected from the group consisting of polyvinyl alcohol, polyallyl alcohol, poly(hydroxyalkylacrylate), poly(hydroxyalkylmethacrylate), poly(hydroxyphenylacrylate), epoxy resin modified polyalcohol, synthesized protein, and polysaccharide.

In addition, the present invention provides the aqueous coating composition, wherein the tri- or more valent silane compound (C) is at least one selected from the group consisting of alkoxysilanes, silanes containing a halogen as a reactive group, and oligomers thereof.

In addition, the present invention provides the aqueous coating composition, wherein the tri- or more valent silane compound (C) is at least one selected from the group consisting of tetraalkoxysilanes and trialkoxysilanes.

In addition, the present invention provides the aqueous coating composition, wherein the mass ratio (A)/(B) between the hydrophilic cationic polymer having an amino group (A) and the nonionic polyalcohol (B) is in a range from 1/49 to 70/30.

Further, the present invention provides the aqueous coating composition, wherein the mass ratio ((A)+(B))/(C) between the total mass of the hydrophilic cationic polymer having an amino group (A) and the nonionic polyalcohol (B) and the mass of the tri- or more valent silane compound (C) is in a range from 60/40 to 5/95.

EFFECTS OF THE PRESENT INVENTION

According to the aqueous coating composition of the present invention, it is possible to provide an organic and inorganic hybrid coating film having a high degree of hardness and excellent abrasion resistance under relatively mild production conditions by a simple manner. The obtained coating film can be used in precision elements such as electronic materials, in addition to general coating applications such as to automobiles, architectural materials, woodworks, and plastics. In addition, the obtained coating film is also useful as a flame resistant coating film having a high degree of hardness derived from inorganic materials.

BEST MODE FOR CARRYING OUT THE INVENTION

The aqueous coating composition of the present invention is an aqueous coating composition obtained by mixing a hydrophilic cationic polymer having an amino group (A), nonionic polyalcohol (B), a tri- or more valent silane compound (C), and water (D).

[Hydrophilic Cationic Polymer Having an Amino Group (A)]

The hydrophilic cationic polymer having an amino group (A) (abbreviated as "a polymer (A)" below) used in the present invention functions as a catalyst in a condensation reaction of the tri- or more valent silane compound (C) in the coating solution. During the condensation reaction, the polymer (A) promotes the condensation reaction of the silane compound so as to increase the cross-linking density. As a result, it is possible to increase the condensation degree of the silane compound during the formation of the coating film, and obtain the coating film having high cross-linking density, and consequently the degree of hardness and the abrasion resistance of the coating film are improved.

In addition, it is believed that the polymer (A) is hydrophilic and contains an amino group in its structure and these factors enable silica sol in water to be stable. When the amino group in the polymer (A) is protonated, the effects for making silica sol more stable are obtained. Therefore, it is preferable that the amino group in the polymer (A) be partially or completely protonated. When the amino group in the polymer (A) is protonated, the amino group in the polymer (A) having a free amino group may be subjected to an acid treatment in water or the polymer (A) having an amino group forming a salt may be used.

When the polymer (A) is protonated, acids such as inorganic acids and organic acids may be used. Examples of the inorganic acid include hydrochloric acid, nitric acid, sulfuric acid, phosphoric acid, and boric acid. Examples of the organic acid include aqueous compounds such as an aqueous compound having a carboxylic acid residue, sulfonic acid residue, or phosphonic acid residue.

As the polymer (A), natural polyamine or synthesized polyamine is preferable for reasons of availability. Examples of the natural polyamine include natural polyamines having a basic amino acid residue in the side chain such as chitin, chitosan, spermidine, bis(3-aminopropyl)amine, homospermidine, and spermine; and synthesized polypeptide such as polylysine, polyhistine, and polyarginine.

Examples of the synthesized polyamine include polyamines having an amino group in the main chain such as polyethyleneimine, and polypropyleneimine, and polyamines having an amino group in the side chain such as polyvinylamine, polyallylamine (PAA), poly(4-vinylpyridine), poly(aminoethyl methacrylate), and poly[4-(N,N-dimethylaminomethylstyrene)]. Among these, polyethyleneimine is preferable because it is easily obtained and it has excellent dispersibility to silica sol.

The polymer (A) may contain structure units which do not contain an amino group, for example, various well-known acrylate units such as a methyl methacylate unit, and various butyl methacrylate unit, various well-known structure units containing a urethane bond, and various well-known structure units containing an ester bond, as long as it does not disturb the affinity or cationic properties of the polymer (A). When the polymer (A) contains a structure unit which does not contain an amino group, the ratio of the structure unit which does not contain an amino group relative to the total structure units of the polymer (A) is preferably 30% by mass or less, more preferably 20% by mass or less, and most preferably 10% by mass or less, in order to obtain a sufficient reaction rate in a hydrolysis reaction or a dehydration and condensation reaction of the tri- or more valent silane compound (C).

The molecular weight of the polymer (A) is preferably in a range from 300 to 100,000, more preferably in a range from 500 to 80,000, and most preferably in a range from 1,000 to 50,000.

The synthesized polymer of the polymer (A) may be obtained by various well-known polymerization methods such as radical polymerization, cationic polymerization, and condensation polymerization of the monomers having an amino group. In addition, the synthesized polymer may also be obtained by polymerizing the polymer having a protective group such as an amide group, and then removing the protective group by acid hydrolysis, for example.

[Nonionic Polyalcohol (B)]

The nonionic polyalcohol (B) (abbreviated as "polyalcohol (B)" below) used in the present invention forms a strong network by strong hydrogen bonds between the hydroxyl group of the polyalcohol (B) and the silanol group during the formation of a silica film which is formed by the condensation reaction of the tri- or more valent silane compound (C). Thereby the obtained coating film has a high degree of hardness and excellent abrasion resistance.

Examples of the nonionic polyalcohol (B) include natural polysaccharides, and synthesized polyalcohols.

Examples of the natural polysaccharide include chitin, cellulose, and starch. These natural polysaccharides may be chemically modified, for example, some of the hydroxyl groups may be alkoxylated.

Examples of the synthesized polyalcohol include polyvinyl alcohol; polyallyl alcohol; poly(hydroxyalkyl acrylate) such as poly(hydroxyethyl acrylate), and poly(hydroxypropyl acrylate); poly(hydroxyalkyl methacrylate) such as poly(hydroxyethyl methacrylate), and poly(hydroxypropyl methacrylate); poly(hydroxyphenyl acrylate) such as poly(hydroxystyrene); synthesized proteins such as polycerine; and modified epoxy resins.

In addition, the skeleton structure of the polyalcohol (B) is not particularly limited, and dendrimer type polyalcohols having a branched structure are also preferably used.

The polyalcohol (B) may be a polymer comprising only the above-mentioned polyalcohol or a copolymer comprising two or more kinds of polyalcohols. In addition, the ratio of the hydroxyl group containing structure in the polyalcohol (B) may be adjusted within a range in which the present effects can be obtained, and it is preferably 70% by mass or more, and more preferably 90% by mass or more.

The molecular weight of the polyalcohol (B) is preferably in a range from 300 to 1,000,000, more preferably in a range from 500 to 80,000, and most preferably in a range from 1,000 to 50,000.

The polyalcohol (B) mixed in the aqueous coating composition may be one polyalcohol alone, or a mixture comprising two or more polyalcohols.

[Tri- or More Valent Silane Compound (C)]

The tri- or more valent silane compound (C) (abbreviated as "silane compound (C)" below) used in the present invention is one which can form a siloxane bond by hydrolysis and form a silica network.

Examples of the silane compound (C) include alkoxy silanes and silanes having a halogen as a reactive group. Here, the alkoxy silanes and the silanes having a halogen as a reactive group include oligomers containing alkoxy silane and silane containing a halogen. Among these, tetraalkoxy silanes and trialkoxy silanes are preferably used.

Examples of the alkoxy silanes include tetraalkoxy silanes such as tetramethoxy silane, tetraethoxyl silane, tetra(2-ethanol)ortho silicate, tetra(n-propoxy) silane, and tetra(isopropoxy) silane; and trialkoxy silanes such as methyltrimethoxy silane, ethyltrimethoxy silane, propyltrimethoxy silane, phenyltrimethoxy silane, γ-glycidoxypropyltrimethoxy silane, γ-methacryloylpropyltrimethoxy silane, γ-(2-aminoethyl) aminopropyltrimethoxy silane, methyltriethoxy silane, and phenyltriethoxy silane.

Examples of the silane having a halogen as a reactive group include chloro silanes such as tetrachloro silane, and methyltrichloro silane.

In addition, compounds which are obtained by partially hydrolyzing the silanes in advance to oligomerize, are also used. The oligomerized silanes may be used in silica sol conditions as silanol. When an oligomerized alkoxy silane is used as the silane compound (C), the oligomerized alkoxy silane having an average polymerization degree in a range from about 2 to 20 is preferably used. In this case, various well-known acids and alkalis can be used as a catalyst for hydrolysis.

The silane compound (C) used in the present invention may be alone or in combination of two or more. A silane compound having many functional groups, in particular, tetraalkoxy silane is preferably used because it makes the degree of hardness of the obtained coating film high. When tetraalkoxy silane is used to improve the degree of hardness of the coating film, the content of tetraalkoxy silane in the total silane compound (C) is preferably 30% by mass or more, and more preferably 50% by mass or more.

In addition, when γ-methacryloylpropyltrimethoxy silane is used together with tetraalkoxy silane, the amino group in the polymer (A) and γ-methacryloylpropyltrimethoxy silane are cross-linked by heat and consequently the coating film becomes stronger and more flexible. In the case of using γ-methacryloylpropyltrimethoxy silane, the content thereof relative to 100% by mass of the silane compound (C) in the aqueous coating composition is preferably less than 50% by mass.

In the aqueous coating composition of the present invention, in addition to the silane compound (C), dialkoxy silanes such as dimethyldimethoxy silane, diethyldimethoxy silane, methylethyldimethoxy silane, diphenyldimethoxy silane, and phenylmethyldimethoxy silane; alkoxy titaniums such as tetraisopropoxy titanium, tetraethoxy titanium, tetrabutoxy titanium, and tetrapropoxy titanium; and alkoxy aluminums such as triethoxy aluminum may be contained as long as the effects of the present invention are not ruined. When these dialkoxy silanes, alkoxy titaniums, or alkoxy aluminums are contained, the content thereof is preferably less than 10% by mass relative to 100% by mass of the aqueous coating composition.

[Aqueous Coating Composition]

The aqueous coating composition of the present invention comprises essentially the polymer (A), the polyalcohol (B), the silane compound (C), and water (D). When the aqueous coating composition of the present invention is coated to a substrate, water is removed, and then this is subjected to heat treatment or alkali treatment, the aqueous coating composition is easily gelated, and entire coating film forms a siloxane bonding network. During this, the polymer (A) forming an ion complex with silica sol and the polyalcohol (B) in the aqueous coating composition are complexed in the coating film, and consequently, the hybrid film of silica and organic polymer is formed.

Mixing order is not particularly limited but it is preferable that the polymer (A) is dissolved in water (D), and the silane compound (C) is added thereto. This order is preferable because dispersibility of the silane compound (C) in sol conditions is excellent. Moreover, the order of adding the polyalcohol (B) is optional.

The mass ratio ((A)/(B)) between the polymer (A) and the polyalcohol (B) during mixing may be adjusted in a range from 2/98 to 70/30, and it is preferably in a range from 10/90 to 50/40, and more preferably in a range from 1/6 to 1/2. When the mass ratio ((A)/(B)) is 2/98 or more, hydrolysis of the silane compound is proceeded well. When the mass ratio ((A)/(B)) is 70/30 or less, the storage stability of the aqueous coating composition is improved.

The content of the silane compound (C) may be adjusted such that the mass ratio ((A)+(B)/(C)) between the total mass of the polymer (A) and the polyalcohol (B) relative to the mass of the silane compound (C) be in a range from 60/40 to 5/95, and the mass ratio is preferably in a range from 40/60 to 15/85, and more preferably in a range from 35/65 to 25/75. When the mass ratio ((A)+(B)/(C)) is 5/95 or less, it is possible to decrease cracks generated in the obtained coating film. When it is 60/40 or more, water resistance of the obtained coating film is improved.

In addition, the amount of the water (D) used is preferably 0.2 to 50 times of the amount of the silane compound (C).

In addition, when alkoxy silane is used as the silane compound having trivalent in the silane compound (C), and the amino group containing a polymer (A) and the silane compound (C) are mixed, the alkoxy silane is hydrolyzed and produces alcohol. The aqueous coating composition may be used after removing the alcohol by a well-known and conventional method, or without removing it at all.

The aqueous coating composition may comprise various well-known solvents such as ethyl cellosolve, propylene glycol monobutyl ether, propylene glycol dibutyl ether, and diethylene glycol monopropyl ether as long as the effects of the present invention are not ruined. In addition, various well-known additives such as a lubricating agent and a wetting agent may be added in the aqueous coating composition.

In addition, the aqueous coating composition of the present invention comprises water as a solvent. If necessary, water soluble solvents besides water, for example, alcohols such as methanol, ethanol, and isopropanol, ketones such as acetone, pyridine, and dimethyl formamide may be added. When the water soluble solvent besides water is added, the content of the water soluble solvent is preferably less than 10% by mass relative to the content of water (D).

In addition, various well-known curing agents such as a water soluble epoxy compound may be added in the aqueous coating composition of the present invention as long as the effects of the present invention are not ruined.

Furthermore, the aqueous coating composition of the present invention may be used as a coloring coating by adding coloring agents such as a pigment or a dye. Examples of the coloring agents which can be added to the aqueous coating composition of the present invention include various well-known and conventional dyes such as acid dyes, acid mordant dyes, direct dyes, and react dyes. Also, well-known and conventional organic pigments, and inorganic pigments can be used. If a pigment is used as a coloring agent, of course, pigment dispersion resins can be added if necessary.

Examples of the substrate which the aqueous coating composition of the present invention is coated include various substrates such as substrates made of glass, metal, wood, and plastic. It is possible to easily obtain the hybrid film of silica and an organic polymer having a high degree of hardness and excellent abrasion resistance on any substrate by coating the aqueous coating composition of the present invention, and hardening.

The coating method on the substrate is not limited. For example, various well-known and conventional methods such as brush coating, dip coating, spray coating, roll coating, bar coating, and air-knife coating can be used. In addition, it is possible to combine these methods.

The film made of the aqueous coating composition of the present invention can be easily hardened by coating on the substrate, and subjecting to alkali treatment or thermal treatment. Moreover, both alkali treatment and thermal treatment may also be carried out.

Examples of the alkali treatment include a method in which an alkali compound is directly sprayed, and a method in which aging is carried out in gas containing an alkali compound. Examples of the alkali compound include triethylamine, trimethylamine, diethylamine, dimethylamine, methylamine, ethylamine, propylamine, diethylethanolamine, aminopropanol, and ammonia.

Among these alkali compounds, ammonia is preferably used. For example, the hybrid film of silica and an organic polymer can be obtained by aging the coating film in an atmosphere of ammonia gas which is generated from aqueous ammonia solution without subjecting it to a high temperature.

In addition, when the coating film is hardened by heating, the heating temperature may be a low temperature in a range from 60 to 120° C., and preferably about 100° C. for 30 minutes. The coating film can be hardened by heating at 100° C. for 30 minutes. When the silane compound (C) comprises epoxy silane, the coating film is preferably hardened by heating, because the epoxy group reacts with polyamines by heat, and thereby toughness is even more improved.

EXAMPLES

Example 1
Synthesis of the Aqueous Coating Composition (1)

After dissolving 0.06 g of branched polyethyleneimine (PEI: marketed by Aldrich, weight average molecular weight: about 25,000) and 0.8 g of the polyvinyl alcohol (PVA) in 9.1 ml of purified water, the pH of the solution was adjusted to 2 by adding droplets of hydrochloric acid of 2N. When 2.94 g of tetramethoxy silane (TMOS) and 0.74 g of γ-glycidoxypropyl trimethoxy silane (GPTMS) were added to the solution while stirring, the solution was separated in an emulsion condition in the initial stage, but it was reacted quickly, and dissolved. The solution was left to stand for 1 hour and the aqueous coating composition (1) was obtained.

Examples 2 to 4

Synthesis of the Aqueous Coating Compositions (2) to (4)

The aqueous coating compositions (2) to (4) were obtained in a manner identical to that of Example 1 along with the compositions of Table 1.

Comparative Examples 1 and 2

The comparative aqueous coating compositions (1) and (2) were obtained in a manner identical to that of Example 1 along with the compositions of Table 1.

Comparative Example 3

In a flask made of glass, 1.2 g of branched polyethyleneimine, 0.5 g of GPTMS, and 10 g of methanol were sufficiently mixed, then the solution was further stirred at 60° C. for 3 hours. After that, the solution was cooled to room temperature, and a mixture comprising 1 g of methanol and 0.15 g of water was added, and then the solution was further stirred for 1 hour. Then, a mixture of 5 g of methanol and 3 g of TMOS was fallen drops into the solution and stirred for 1 hour, and then the solution was aged for 24 hours to obtain the comparative aqueous coating composition.

Comparative Example 4

The composition was prepared in a manner identical to that of Example 1 along with the composition of Table 1. The obtained composition was gelated, and the composition could not be used as a coating composition.

TABLE 1

|  | Polymer (A) (g) | Polyalcohol (B) (g) | Silane compound (C) (g) | Solvent (D) (g) | Acid treatment (pH) |
|---|---|---|---|---|---|
| Ex. 1 | PEI 0.06 | PVA 0.8 | TMOS 2.94 GPTMS 0.74 | Water 9.1 | Hydrochloric acid (PH2) |
| Ex. 2 | PEI 0.1 | PVA 0.1 | TMOS 1.46 GPTMS 0.63 | Water 4.2 | Hydrochloric acid (PH2) |
| Ex. 3 | PEI 0.01 | PVA 0.5 | TMOS 0.65 GPTMS 0.28 | Water 4.2 | Hydrochloric acid (PH2) |
| Ex. 4 | PAA 0.06 | PVA 0.8 | TMOS 2.94 GPTMS 0.74 | Water 9.1 | Hydrochloric acid (PH2) |
| Comp. Ex. 1 | — | PVA 0.8 | TMOS 2.73 GPTMS 0.68 | Water 8.5 | Hydrochloric acid (PH2) |
| Comp. Ex 2 | PEI 0.01 | — | TMOS 0.15 GPTMS 0.06 | Water 0.42 | Hydrochloric acid (PH2) |
| Comp. Ex. 3 | PEI 1.2 | — | TMOS 3.0 GPTMS 0.5 | Methanol 16.0 Water 0.15 | — |
| Comp. Ex. 4 | PEI 0.03 | PVA 0.4 | TMOS 0.95 GPTMS 0.24 | Water 4.0 | — |

Application Example 1

Preparation of the Coating Film

The aqueous coating composition (1) obtained in Example 1 was coated on the slide glass and the PET film substrate having a thickness of 100 μm which was previously treated with corona to form a film, and then these were dried at 80° C. for 30 minutes. Both the obtained films were clear, and the thickness of the film on the slide glass was about 2 μm, and the thickness of the film on the PET film was about 5 μm.

The conditions of the coating before formation of the coating film, the properties of the obtained coating film were evaluated and the results of the evaluation were shown in Table 2.

<Conditions of the Coating Composition>

The conditions of the coating solution after preparation of the coating composition were visually observed. The coating composition which was not gelated was denoted by "good", and the coating composition which was gelated was denoted by "bad".

<Conditions of the Coating Film>

The existence of cracks in the coating film was visually observed. The coating film which had no cracks was denoted by "good", and the coating film which had cracks was denoted by "bad".

<Pencil Hardness>

The pencil hardness of the coating film formed on the slide glass substrate was measured according to JIS K5400.

<Abrasion Resistance>

The coating film on the PET film substrate was rubbed back and forth 100 times with a steel wool #0000 with a load of 500 g, and haze value of the coating film before and after test was measured.

<Solvent Resistance>

The coating film was rubbed back and forth 100 times with a cotton absorbing toluene. The coating film which had no change by visual observation was denoted by "good", and the coating film which had a change by visual observation was denoted by "bad".

<Contamination Resistance>

The coating film was colored with a black marker, and after 24 hours the coloring was wiped off with a waste cloth soaked with hexane. The change of the coating film was visually observed. The coating film which had no change was denoted by "good", and the coating film which had change was denoted by "bad".

These evaluation results were shown in Table 2. It was confirmed that the obtained coating film had a high degree of hardness and excellent abrasion resistance.

Application Examples 2 to 4

The coating film was obtained by coating the aqueous coating composition (2) to (4) obtained in Examples 2 to 4 on the slide glass and the PET film in a manner identical that of Application Example 1. The obtained coating film was evaluated in a manner identical to that of Example 1. The evaluation results were shown in Table 2. It was confirmed that the obtained coating film had a high degree of hardness and excellent abrasion resistance.

Comparative Application Examples 1 to 3

The comparative coating film was obtained by coating the comparative aqueous coating composition obtained in Comparative Examples 1 to 3 on the slide glass and the PET film in a manner identical that of Application Example 1. The obtained coating film was evaluated in a manner identical to that of Example 1. The evaluation results are shown in Table 2.

Both of the coating film of Comparative Application Example 1 which did not comprise the cationic hydrophilic polymer having an amino group and the coating film of Comparative Application Example 3 which comprised non-cationic hydrophilic polymer had less hardness and worse abrasion resistance. In addition, the coating film of Comparative Application Example 2 which did not comprise polyalcohol had cracks on the entirety thereof, and it was impossible to evaluate a coating film in which pencil hardness, abrasion resistance, solvent resistance, and contamination resistance. Furthermore, a coating film was not even obtained in Comparative Application Example 4, so the coating film could not be evaluated.

TABLE 2

|  | Coating conditions | Conditions of the coating film | Pencil hardness | Abrasion resistance | Solvent resistance | Contamination resistance |
| --- | --- | --- | --- | --- | --- | --- |
| Application Example 1 | good | good | >7H | 0.5 | good | good |
| Application Example 2 | good | good | >7H | 0.4 | good | good |
| Application Example 3 | good | good | >7H | 1.2 | good | good |
| Application Example 4 | good | good | 6H | 1.5 | good | good |
| Comparative Application Example 1 | good | good | 6H | 2.85 | good | good |
| Comparative Application Example 2 | good | bad | — | — | — | — |
| Comparative Application Example 3 | good | good | 5H | 10.7 | good | good |
| Comparative Application Example 4 | bad | — | — | — | — | — |

In Table 2, "—" means that the evaluation was not possible.

INDUSTRIAL APPLICABILITY

According to the aqueous coating composition of the present invention, it is possible to produce an organic and inorganic hybrid coating film having a high degree of hardness and excellent abrasion resistance in relative mild production conditions by a simple method. The obtained coating film can be used for precision elements such as electronic material, in addition to general coating applications such as for automobiles, architectural materials, woodworks, and plastics. In addition, the obtained coating film is also useful as a flame resistance coating film having a high degree of hardness derived from inorganic materials.

The invention claimed is:

1. An aqueous coating composition comprising:
    a hydrophilic cationic polymer (A) which is selected from the group consisting of polyvinylamine, polyallylamine, polyethyleneimine, and polypropyleneimine, and of which an amino group is protonated by an acid;
    nonionic polyalcohol (B);
    a silane compound (C) being at least one selected from the group consisting of tetraalkoxysilanes and trialkoxysilanes; and
    water (D),
    wherein the mass ratio ((A)+(B))/(C) between the total of the hydrophilic cationic polymer (A) and the nonionic polyalcohol (B), and the silane compound (C) is in a range from 60/40 to 5/95.

2. The aqueous coating composition according to claim 1, wherein the nonionic polyalcohol (B) is at least one selected from the group consisting of polyvinyl alcohol, polyallyl alcohol, poly(hydroxyalkylacrylate), poly(hydroxyalkylmethacrylate), poly(hydroxyphenylacrylate), epoxy resin modified polyalcohol, synthesized protein, and polysaccharide.

3. The aqueous coating composition according to claim 2, wherein the mass ratio (A)/(B) between the hydrophilic cationic polymer (A) and the nonionic polyalcohol (B) is in a range from 2/98 to 70/30.

4. The aqueous coating composition according to claim 1, wherein the hydrophilic cationic polymer (A) is polyallylamine or polyethyleneimine of which an amino group is protonated.

5. The aqueous coating composition according to claim 2, wherein the nonionic polyalcohol (B) is polyvinyl alcohol.

6. The aqueous coating composition according to claim 1, wherein the silane compound (C) is γ-glycidoxypropyl trimethoxy silane and tetraalkoxy silane.

7. The aqueous coating composition according to claim 4, wherein the mass ratio (A)/(B) between the hydrophilic cationic polymer (A) and the nonionic polyalcohol (B) is in a range from 2/98 to 70/30.

8. The aqueous coating composition according to claim 5, wherein the mass ratio (A)/(B) between the hydrophilic cationic polymer (A) and the nonionic polyalcohol (B) is in a range from 2/98 to 70/30.

9. The aqueous coating composition according to claim 2, wherein the mass ratio ((A)+(B))/(C) between the total of the hydrophilic cationic polymer (A) and the nonionic polyalcohol (B) and the silane compound (C) is in a range from 60/40 to 5/95.

10. The aqueous coating composition according to claim 4, wherein the mass ratio ((A)+(B))/(C) between the total of the hydrophilic cationic polymer (A) and the nonionic polyalcohol (B) and the silane compound (C) is in a range from 60/40 to 5/95.

11. The aqueous coating composition according to claim 5, wherein the mass ratio ((A)+(B))/(C) between the total of the hydrophilic cationic polymer (A) and the nonionic polyalcohol (B) and the silane compound (C) is in a range from 60/40 to 5/95.

12. The aqueous coating composition according to claim 6, wherein the mass ratio ((A)+(B))/(C) between the total of the hydrophilic cationic polymer (A) and the nonionic polyalcohol (B) and the silane compound (C) is in a range from 60/40 to 5/95.

* * * * *